US006017376A

United States Patent [19]

Doig et al.

[11] Patent Number: 6,017,376

[45] Date of Patent: Jan. 25, 2000

[54] AIR EXTRACT SYSTEM FOR A CONTAINMENT

[75] Inventors: Raymond Doig; Charles P. Buckley, both of Warrington, United Kingdom

[73] Assignee: British Nuclear Fuels plc, Warrington, United Kingdom

[21] Appl. No.: 08/952,063

[22] PCT Filed: May 7, 1996

[86] PCT No.: PCT/GB96/01080

§ 371 Date: Nov. 6, 1997

§ 102(e) Date: Nov. 6, 1997

[87] PCT Pub. No.: WO96/36973

PCT Pub. Date: Nov. 21, 1996

[30] Foreign Application Priority Data

May 18, 1995 [GB] United Kingdom .................. 9510079

[51] Int. Cl.[7] .............................. B01D 50/00; G21F 7/04

[52] U.S. Cl. ............................ 55/385.2; 55/502; 55/506; 55/510; 137/812; 376/314

[58] Field of Search .......................... 55/353, 351, 385.2, 55/DIG. 9, 506, 505, 502, 510; 137/810, 808, 811, 812, 813; 376/314, 313

[56] References Cited

U.S. PATENT DOCUMENTS

| | | |
|---|---|---|
| 3,888,556 | 6/1975 | Strong et al. . |
| 4,112,977 | 9/1978 | Syred et al. . |
| 4,422,476 | 12/1983 | Blanchard . |
| 4,704,951 | 11/1987 | Pruchon . |
| 4,773,922 | 9/1988 | Ross et al. . |
| 4,842,347 | 6/1989 | Jacobson . |
| 5,247,547 | 9/1993 | Doig . |

FOREIGN PATENT DOCUMENTS

| | | |
|---|---|---|
| 2338734 | 8/1977 | France . |
| 2155354 | 1/1985 | United Kingdom . |
| 2238503 | 6/1991 | United Kingdom . |

*Primary Examiner*—David A. Simmons
*Assistant Examiner*—Fred Prince
*Attorney, Agent, or Firm*—Nixon & Vanderhye P.C.

[57] ABSTRACT

A containment, such as a glovebox (4), has an air extract system comprising suction means which extracts air from the containment through a vortex amplifier (1) mounted in a containment wall opening (2). The amplifier (1) serves to control the extent of suction extracted from the containment. Air exiting from the amplifier is drawn through a filter (32) removably arranged within a filter tube (31), which extends substantially parallel to the containment wall (3). A transfer passage (29), having a cross-sectional area less than that of the wall opening (2), provides a communication between an outlet side of the amplifier (1) and the filter tube (31). At least an initial portion of the transfer passage (29) extends perpendicularly to the wall. The filter tube (31) has open ends normally closed by covers (40, 41). Removal of the covers (40, 41) enables a clean filter to be installed in the filter tube while ejecting the used filter.

8 Claims, 4 Drawing Sheets

AIR EXTRACT SYSTEM FOR A CONTAINMENT

BACKGROUND OF THE INVENTION

1. Field of the Invention

The present invention relates to a containment, such as a glovebox, as used in the nuclear industry. In particular, the invention relates to an air extract system for use in such a containment. Such an air extract system serves to maintain the pressure in the containment at below atmospheric and to extract and filter wastes and contaminants produced by operations in the containment.

2. Discussion of Prior Art

It is known in such air extract systems to arrange a vortex amplifier in an opening provided in the containment wall for controlling the amount of suction extracted from the containment. Included in the system is a filter assembly having a housing containing a filter element which, when used, can be posted into the containment and replaced by a fresh element. The used filter element may be posted into the containment through the opening containing the vortex amplifier or through a further opening axially spaced from the amplifier. A bag, or similar receptacle, receives the used filter element and requires subsequent removal from the containment. If the containment contains other equipment this may require the size of the containment to be increased, or if the containment is required for other operations, such operations may have to be interrupted or delayed, otherwise it may be necessary to provide a separate vortex amplifier and filter containment. In both of these arrangements the filter housing extends outwardly from the containment wall and is therefore inefficient regarding utilisation of space. Such a disposition also places a restriction on the location of the filter housing and, in addition, may not permit a compact vortex amplifier design.

SUMMARY OF THE INVENTION

According to the present invention there is provided a containment, such as a glovebox, having an air extract system comprising an extract suction means, a vortex amplifier mounted in an opening in a wall of the containment serving to control the extent of suction by the suction means from the containment, the air extract system further including a filter assembly comprising a filter removably arranged within a filter tube which extends substantially parallel to said wall, and a transfer passage having at least an initial portion extending perpendicularly to said wall and providing a communication between an outlet side of the vortex amplifier and the filter tube.

Preferably the whole of the transfer passage extends perpendicularly to said wall.

The transfer passage may have a cross-sectional area less than that of said opening.

In a preferred embodiment the filter comprises an annular support member located at each end thereof and an annular support member located intermediate the two ends, each support member being in sliding, sealing engagement with an inner wall of the filter tube, the filter further comprising a hollow cylindrical element extending between an annular support member at one end of the filter and the intermediate annular support member, the transfer passage communicating with the filter tube at a position between the intermediate annular support member and the annular support member at the other end of the filter.

Preferably each annular support member is provided with a peripheral seal comprising a resilient sealing member which seals against the inner wall of the filter tube.

The filter tube preferably has open opposite ends, each of which is normally closed by a removable cover, whereby upon removal of said covers a clean filter can be posted through one end of the filter tube while a used filter is ejected from the opposite end.

A transfer tube containing a clean filter may be attached to an end of said filter tube upon removal of the cover from said end, the transfer tube comprising transfer means operable to move the clean filter from the transfer tube into the filter tube, whereby the clean filter serves to eject the used filter from the filter tube.

The invention as defined above provides an air extract system which substantially overcomes the aforementioned disadvantages associated with the prior art.

BRIEF DESCRIPTION OF THE DRAWINGS

Embodiments of the present invention will now be described, by way of example, with reference to the accompanying drawings, in which.

DETAILED DESCRIPTION OF PREFERRED EMBODIMENTS

Figure 1:
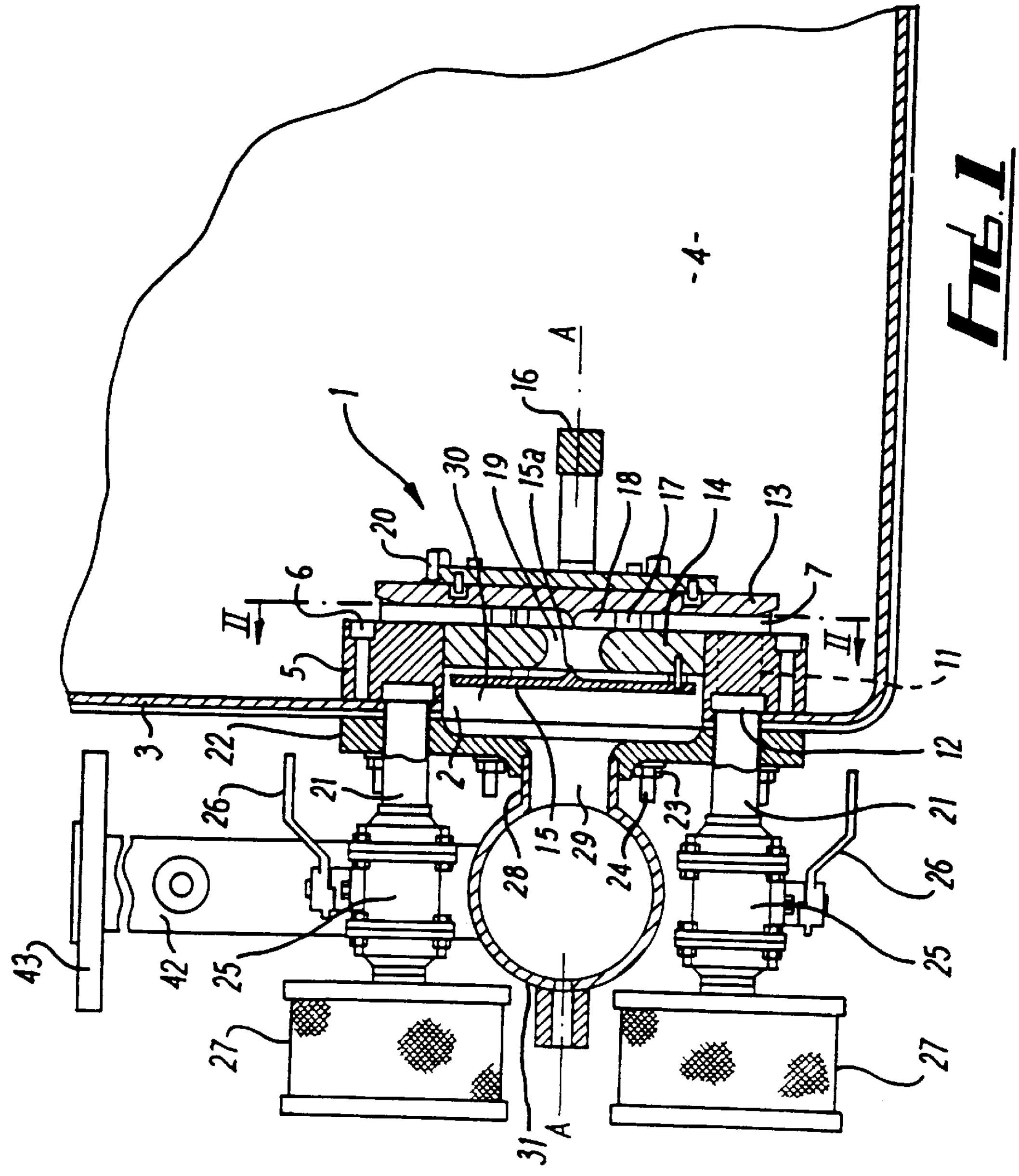
FIG. 1 is a cross-sectional elevation of a glovebox extract system.
Figure 2:
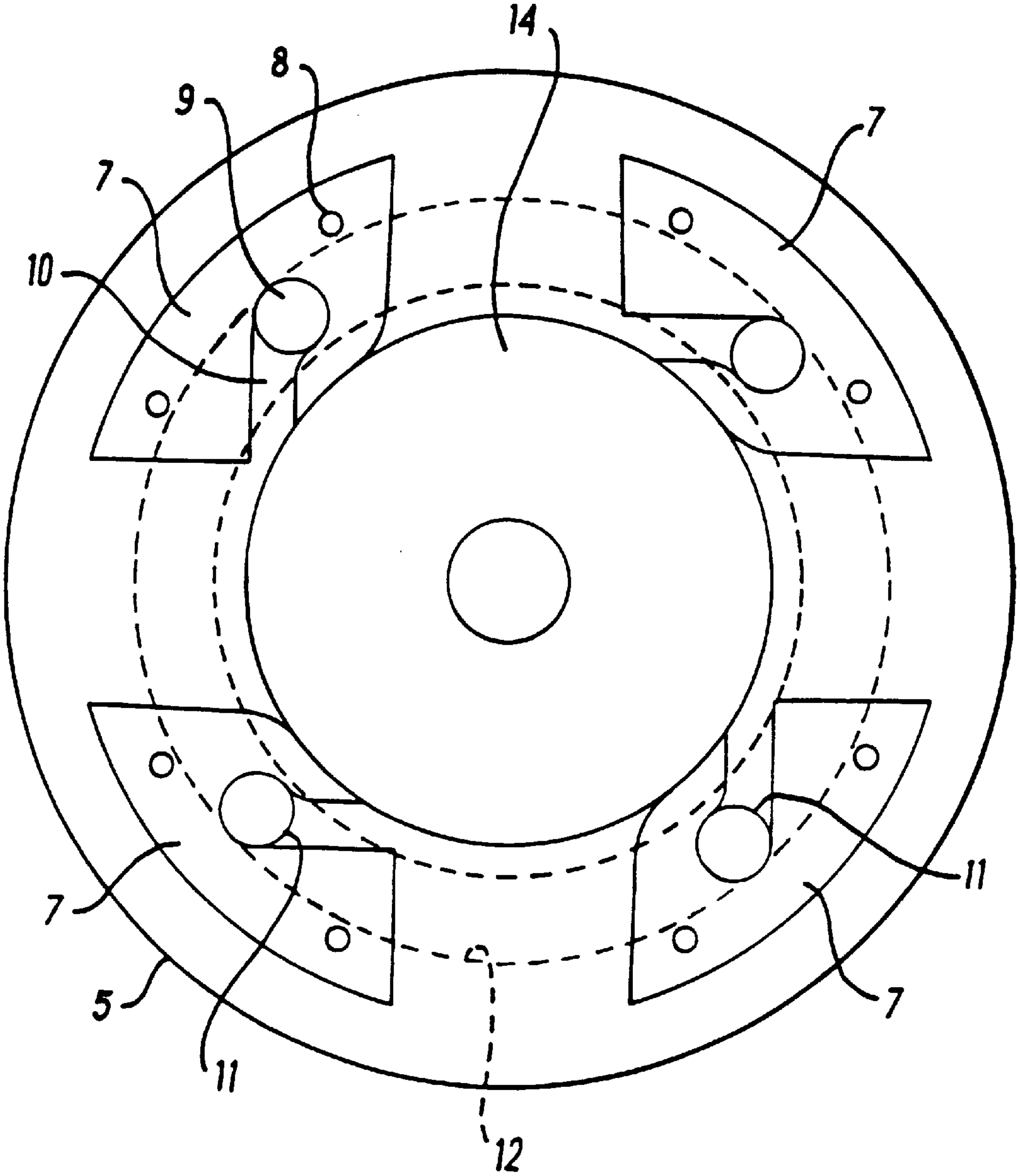
FIG. 2 is an end view, at a larger scale, of a control port arrangement on the line II—II in FIG. 1.

A vortex amplifier 1 is mounted in an opening 2 provided in a planar wall 3 of a glovebox 4. The vortex amplifier 1 comprises an annular member 5 attached to the wall 3 by screws 6 and has an inner diameter corresponding in size to the diameter of the opening 2. Four control nozzle plates 7 are fixedly secured by spring dowel pins 8 (see FIG. 2) to the face of the annular member 5 remote from the wall 2. The plates 7 are equiangularly spaced apart around the annular member 5 and each plate has a channel or slot having a circular portion 9 communicating with a nozzle portion 10, the nozzle portion 10 being such as to be approximately tangential to the inner periphery of the annual member 5 and with each nozzle being directed in the same direction, as shown in FIG. 2. The circular portions 9 each overlie a corresponding circular hole 11 in the member 5, the holes 11 communicating with a channel 12 in the face of the member 5 abutting the glovebox wall 2.

An integral unit comprising a cover plate 13, a vortex plate 14 and a diffuser plate 15, which cooperates with the annular member 5. At the centre of the diffuser plate 15 on the surface thereof facing the vortex plate 14 is a substantially conical pip 15*a* having a smooth streamlined surface. A handle 16 is attached to the cover plate 13. The cover plate 13 can be mounted on the vortex plate 14 and separated therefrom by spacers (not shown). The lengths of the spacers are such that when the cover plate 13 abuts against the nozzle plates 7, the vortex plate 14, which has an outer diameter equal to the inner diameter of the annular member 5, is within the annular member with the faces of the vortex plate 14 and the annular member 5 which face the cover plate 13 being co-planar.

In a similar manner the diffuser plate 15 can be fixedly mounted on the opposite face of the vortex plate 14 at a fixed predetermined spacing therebetween.

The region between the diffuser plate 15 and the vortex plate 14 defines a vortex chamber 17 and the region between the vortex plate 14 and the diffuser plate constitutes a radial diffuser. A substantially conical portion 18 having a smooth streamlined surface is located centrally on the cover plate 13 to face a central opening 19 in the vortex plate 14. The unit comprising the cover plate 13, vortex plate 14 and diffuser plate 15 can be releasably mounted in position by setscrews 20 which extend into screw-threaded holes provided in the annular member 5.

The channel 12 in the member 5 communicates with the outside atmosphere through a pair of conduits 21 located outside the glovebox 4. Each conduit 21 passes through a flange 22 which is mounted on the outer surface of the glovebox wall 3 by nuts 23 screwed onto studs 24 extending from the wall. Each conduit 21 includes a valve 25, operated by a handle 26, and terminates in a filter 27.

Figure 3:
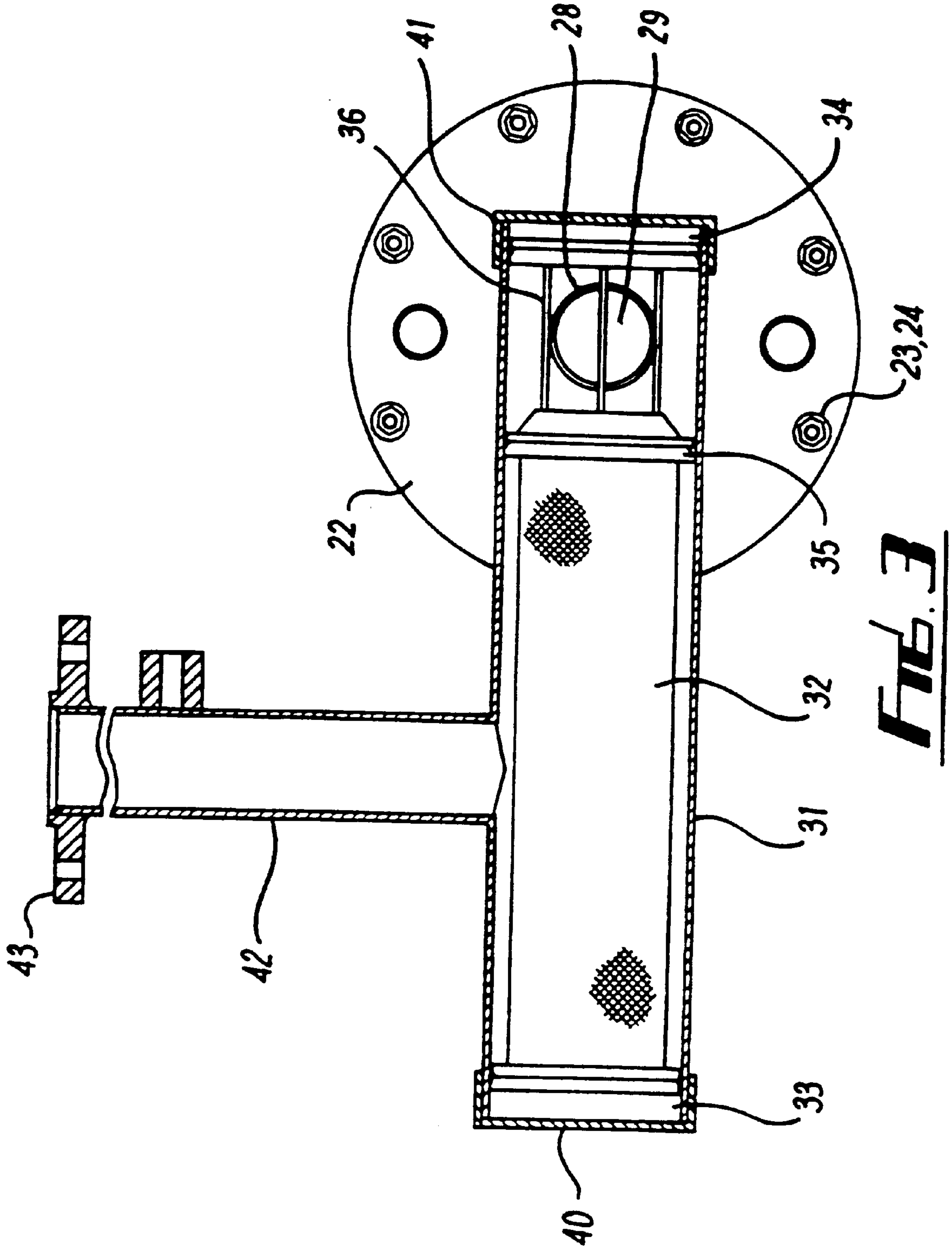
FIG. 3 is a cross-sectional elevation of a filter assembly for the glovebox extract system.
Figure 5:
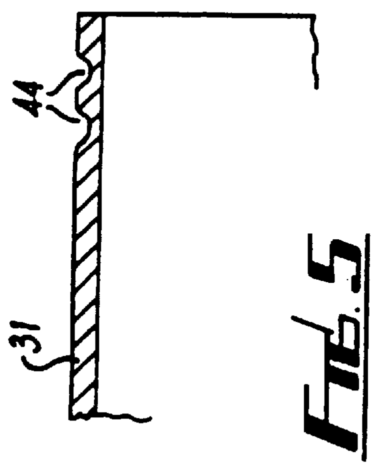
FIG. 5 is a fragmentary cross-section through an end of a filter tube.
Figure 4:
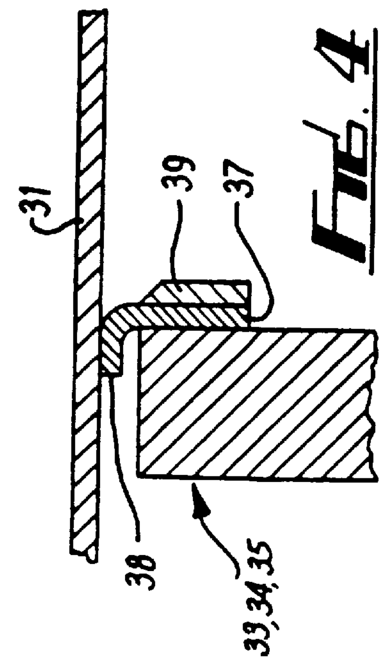
FIG. 4 is a fragmentary cross-section through a typical seal assembly for the filter.

A short horizontal tube 28, mounted on the flange 22, defines a transfer passage 29 extending along the axis A—A of the vortex amplifier and perpendicularly to the glovebox wall 3. The transfer passage 29 has a cross-sectional area smaller than that of the opening 2 and has an inlet end communicating with an outlet chamber 30 and an outlet end opening into a filter housing 31. As best seen in FIG. 3, the filter housing 31 comprises a horizontal filter tube extending parallel to the glovebox wall 3 and perpendicularly to the transfer passage 29 and the axis A—A of the vortex amplifier. The filter tube 31 contains a filter 32 having annular support members 33, 34 at opposite ends and an annular support member 35 positioned intermediate the two ends. Each of the three annular support members 33, 34, 35 is in sliding, sealing engagement with the wall of the filter tube 31. The intermediate annular support member 35 is spaced from the end support member 34 by a plurality of bars 36 so that the two support members 34, 35 provide a seal with the filter tube 31 on either side of the outlet end of the transfer passage 29. As seen in FIG. 4, sealing engagement of the annular support members 33, 34, 35 with the internal surface of the filter tube 31 is provided by a lip seal assembly. The lip seal assembly comprises a resilient sealing member 37 having an outer lip portion 38 which presses against the filter tube 31. A retaining ring 39 holds the sealing member 37 in position. The ends of the filter tube 31 are closed by removable covers 40, 41. An outlet duct 42 from the filter tube 31 has a flanged end 43 for connection to an extract line and is positioned so as to be substantially mid-way between the annular support members 33, 35. A pair of grooves 44, see FIG. 5, are provided on the outer surface of the filter tube 31 at an end thereof corresponding to that normally closed by the cover 41. These grooves 44 facilitate the attachment of a receptacle, such as a filter changing bag, as hereinafter described.

If desired, the filter tube 31 may be arranged parallel to the glovebox wall 3 at a position above the vortex amplifier 1. In this configuration the transfer passage 29 has an initial inlet portion extending horizontally along the axis A—A of the vortex amplifier 1 and perpendicularly to the glovebox wall 3 and then turns through an angle to extend upwardly for communication with the elevated filter tube 31.

In operation, and with a filter 32 loaded into the filter tube 31, as shown in FIG. 3, the outlet duct 42 is connected to an extract line providing the air extract suction means. A pre-determined pressure below atmospheric in the glovebox 4 is maintained by the vortex amplifier 1. Radial air flow enters the vortex chamber 17 of the vortex amplifier 1 from the glovebox 4 by passing over the edge of the cover plate 13 and between the plates 7. Simultaneously, a control flow issues at the nozzles 10 into the vortex chamber 17. The control flow is drawn from the outside atmosphere through the filters 27, valves 25 and conduits 21 into the channel 12 of the annular member 5.

The control flow creates a vortex in the vortex chamber 17 to throttle the flow from the glovebox 4. The throttled flow from the vortex chamber 17 is drawn through opening 19 and into the radial diffuser between the vortex plate 14 and the diffuser plate 15. From the radial diffuser the air flow passes into the outlet chamber 30 and then through the transfer passage 29 into the filter element 32. The flow passes through the cylindrical wall of the filter element 32 to emerge at the outlet duct 42 as a filtered flow.

If there is a breach of containment in the glovebox 4, for example a ruptured glove, an increase in pressure occurs within the glovebox 4. The pressure at the outlet duct 42 remains the same as before. Consequently, the resistance to the flow from the glovebox 4 provided by the control flow at the nozzles 10 is reduced, allowing increased radial flow into the vortex chamber 17 of the vortex amplifier 1 to compensate for the breach in containment.

Figure 6:
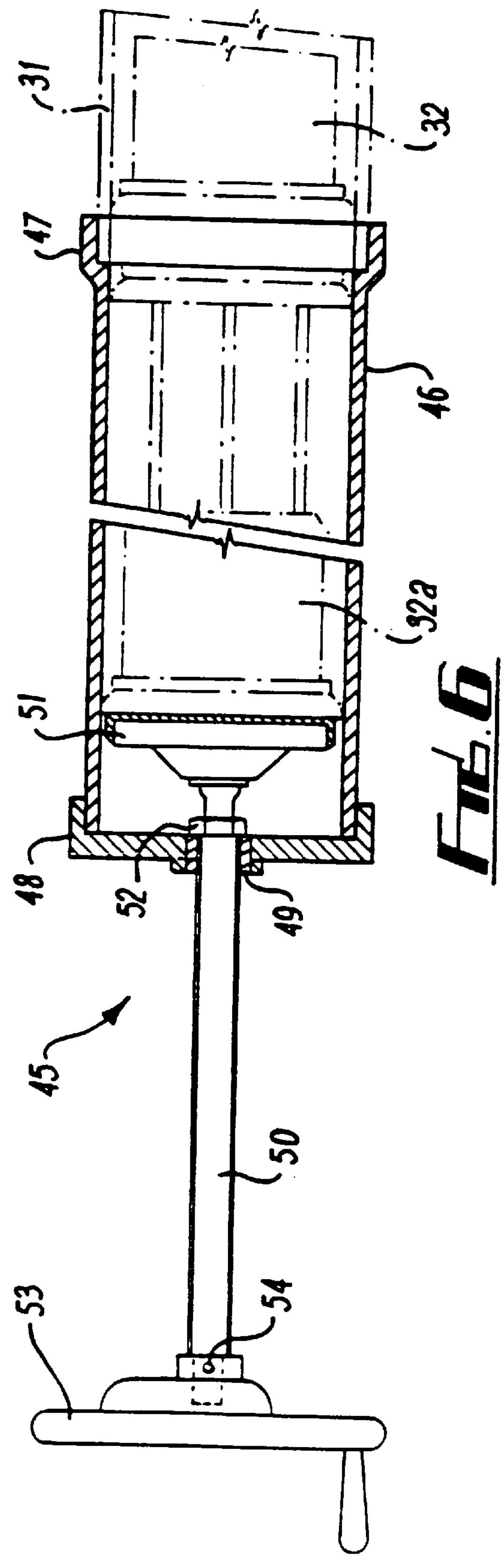
FIG. 6 is a cross-sectional elevation of a filter changing device.

A filter changing device 45 is shown in FIG. 6 and comprises a transfer tube 46 having an inner diameter corresponding to the inner diameter of the filter tube 31. At one end of the transfer tube 46, the inner diameter is increased to form a spigot 47 which can be placed over the end of the filter tube 31. The spigot 47 is provided with slots (not shown) which cooperate with pins on the filter tube 31 to form a bayonet type connection. An end cover 48, fitting over the other end of the transfer tube 46, is provided with a central bore in which an internally screw-threaded bush 49 is received. Extending through the bush 49 is an operating screw 50 which has an external screw thread corresponding to the internal screw thread of the bush 49. A piston head 51 is supported within the transfer tube 46 on an end of the operating screw 50. Linear movement of the operating screw 50 is limited by a nut 52 provided adjacent to the piston head 51. A handwheel 53 is secured by a spring dowel pin 54 to an end of the operating screw 50 remote from the piston head 51.

To replace the filter 32, the covers 40 and 41 are removed from the tube 31. The beaded edge of a receptacle, for example, a changing bag, is attached to the grooves 44 at the end of the tube 31 from which the cover 41 has been removed. With a fresh replacement filter 32*a* located within the transfer tube 46, the filter changing device 45 is positioned so that the spigot 47 receives the end of the filter tube 31 from which the cover 41 has been removed. By rotating the handwheel 53 the operating screw 50 moves linearly so that the piston head 51 moves through the transfer tube 46. This causes the replacement filter 32*a* to eject the used filter 32 from the filter tube 31 into the changing bag. When the replacement filter 32*a* reaches the position previously occupied by the used filter, the filter changing device 45 can be removed and the covers 40, 41 re-attached to the filter housing 31.

An advantage of the extract system of the present invention is that it allows flexibility in determining the position of the filter tube.

We claim:

1. A containment having an air extract system comprising:

an extract suction means, a vortex amplifier mounted in an opening in a wall of the containment serving to control the extent of suction by the suction means from the containment, a filter assembly comprising a filter removably arranged within a filter tube which extends substantially parallel to said wall, and a transfer passage having at least an initial portion extending perpendicularly to said wall and providing a communication between an outlet side of the vortex amplifier and the filter tube.

2. A containment as claimed in claim 1, wherein the transfer passage extends perpendicularly to said wall.

3. A containment as claimed in claim 1, wherein the cross-sectional area of the transfer passage is less than that of the opening in the containment wall.

4. A containment as claimed in claim 1, wherein the filter comprises an annular support member located at each end thereof and an annular support member located intermediate the two ends, each support member being in sliding sealing engagement with an inner wall of the filter tube, the filter further comprising a hollow cylindrical element extending between an annular support member at one end of the filter and the intermediate annular support member, the transfer passage communicating with the filter tube at a position between the intermediate annular support member and the annular support member at the other end of the filter.

5. A containment as claimed in claim 4, wherein each annular support member is provided with a peripheral seal comprising a resilient sealing member which seals against the inner wall of the filter tube.

6. A containment as claimed in claim 1, wherein the filter tube has open opposite ends, each of which is normally closed by a removable cover, whereby upon removal of said covers a clean filter can be posted through one end of the filter tube while a used filter is ejected from the opposite end.

7. A containment as claimed in claim 6, wherein a transfer tube containing a clean filter is attached to an end of said filter tube upon removal of the cover from said end, the transfer tube comprising transfer means operable to move the clean filter from the transfer tube into the filter tube, whereby the clean filter serves to eject the used filter from the filter tube.

8. A containment having an air extract system for operation in conjunction with a source of suction, said system comprising:

a vortex amplifier mounted in an opening in a wall of the containment serving to control the extent of suction by the source of suction from the containment:

a filter assembly comprising a filter removably arranged within a filter tube which extends substantially parallel to said wall, and a transfer passage having at least an initial portion extending perpendicularly to said wall and providing a communication between an outlet side of the vortex amplifier and the filter tube.

* * * * *